(12) United States Patent
Bamba

(10) Patent No.: US 8,768,613 B2
(45) Date of Patent: Jul. 1, 2014

(54) TOUR ROUTE GENERATING DEVICE, TOUR ROUTE GENERATING METHOD, AND PROGRAM

(75) Inventor: Syunsuke Bamba, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/267,155

(22) Filed: Oct. 6, 2011

(65) Prior Publication Data

US 2012/0136566 A1 May 31, 2012

(30) Foreign Application Priority Data

Nov. 29, 2010 (JP) ................................. 2010-265649

(51) Int. Cl.
*G01C 21/00* (2006.01)
*H04W 24/00* (2009.01)

(52) U.S. Cl.
USPC ...................................... 701/410; 455/456.1

(58) Field of Classification Search
CPC ............... G01C 21/3614; B64F 1/002; G08G 1/096838; H04W 28/06; G05D 1/105; G05D 1/0202; G05D 1/0022; G05D 1/101; G05D 1/0206
USPC ........ 701/400–541; 340/988–996; 455/456.1, 455/67.11

See application file for complete search history.

(56) References Cited

U.S. PATENT DOCUMENTS

| | | | | |
|---|---|---|---|---|
| 2007/0005242 A1* | 1/2007 | Kato et al. | ..................... | 701/211 |
| 2008/0266695 A1* | 10/2008 | Handa | .............................. | 360/43 |
| 2009/0234577 A1* | 9/2009 | Rinscheid | ..................... | 701/201 |
| 2010/0106401 A1* | 4/2010 | Naito et al. | ................... | 701/201 |
| 2011/0187547 A1* | 8/2011 | Kweon | .......................... | 340/670 |

FOREIGN PATENT DOCUMENTS

| JP | 2004-109100 | * | 4/2004 |
|---|---|---|---|
| JP | 2004109100 | * | 4/2004 |
| JP | 2008-241416 | | 10/2008 |

* cited by examiner

*Primary Examiner* — Muhammad Shafi
(74) *Attorney, Agent, or Firm* — Oblon, Spivak, McClelland, Maier & Neustadt, L.L.P.

(57) ABSTRACT

A tour route generating apparatus includes a distance obtaining unit which obtains a target route distance of a tour route to be generated; a reference point obtaining unit which obtains a reference point as a start point of the tour route; a waypoint determination unit which determines a waypoint of the tour route; and a tour route generating unit which generates the tour route such that a route distance from the reference point to the reference point via the waypoint becomes the target route distance.

18 Claims, 18 Drawing Sheets

TOUR ROUTE GENERATING DEVICE, TOUR ROUTE GENERATING METHOD, AND PROGRAM

BACKGROUND

The present disclosure relates to a tour route generating device, a tour route generating method, and a program.

In recent years, a navigation device has been widely distributed which guides a route from a current position to a destination based on positional information obtained by a GPS (Global Positioning System) or the like. When a user of the navigation device inputs a destination, the navigation device searches for a route from a current position to a destination and guides the user the searched route.

A function provided by a navigation device has been realized as a function of a small-sized electronic device such as a mobile phone, for example. A portable navigation apparatus has also been introduced, and such a navigation device has been used not only while being mounted on a vehicle but also while walking or while being placed on a bicycle. Thus, the navigation device has been developed so as to have more functions and be more entertaining.

For example, Japanese Unexamined Patent Application Publication No. 2008-241416 discloses a navigation device capable of searching for a route, wherein the traveling time that it takes to get to a destination becomes the input time, based on the input destination and the traveling time. According to such a navigation device, it is possible to walk or run to a destination by searching for a route through which it is possible to get to the destination for a desired time period during un-occupied time.

In addition, Japanese Unexamined Patent Application Publication No. 2004-109100 discloses a navigation device capable of searching for a route through which calorie consumption during travel from a start point to the start point via a destination becomes target calorie consumption. According to such a navigation device, it is possible to determine a route based on calorie consumption for purposes of health.

SUMMARY

However, it is necessary for a user to designate a destination in order to search for a route. For this reason, there is a problem in that it is difficult to respond to a request of a user who has not decided on a destination. Thus, it is desirable to provide a new and improved tour route generating device, a tour route generating method, and a program capable of generating a tour route from a start point without designation of a destination by a user.

According to an embodiment of the present disclosure, there is provided a tour route generating apparatus including: a distance obtaining unit which obtains a target route distance of a tour route to be generated; a reference point obtaining unit which obtains a reference point as a start point of the tour route; a waypoint determination unit which determines a waypoint of the tour route; and a tour route generating unit which generates the tour route such that a route distance from the reference point to the reference point via the waypoint becomes the target route distance.

With such a configuration, the tour route generating apparatus can determine the waypoint and generate a tour route from a reference point to the reference point via the waypoint. At this time, the reference point may be a current position, for example, or may be a point designated by a user. Here, the waypoint is automatically determined. For this reason, the user can obtain a tour route without designating a destination.

In addition, the waypoint determination unit may determine a plurality of waypoints, and the tour route generating unit may generate the tour route by searching for routes between the reference point and the waypoints and between the plurality of waypoints.

In addition, the waypoint determination unit may determine a direction from the reference point and determine a first waypoint positioned in the direction from the reference point and a second waypoint and a third waypoint which are positioned in mutually opposite directions while interposing a line connecting the reference point and the first waypoint.

In addition, the waypoint determination unit may randomly determine the direction every time a tour route is generated.

In addition, the tour route generating apparatus may further include a request obtaining unit which obtains a request with respect to the tour route, and the tour route generating unit may search for the routes between the reference point and the waypoints and between the plurality of waypoints based on the request.

In addition, the waypoint determination unit may determine the waypoints based on the request.

In addition, the distance obtaining unit may obtain the target route distance by converting input information regarding calories or traveling time into a distance based on a reference in accordance with a transportation form.

In addition, the tour route generating apparatus according may further include a position obtaining unit which obtains information regarding a current position, and the reference point obtaining unit may obtain the current position as the reference point.

In addition, the waypoint determination unit may correct the waypoints to points through which a user can actually go, with the use of map data near the waypoints after determination of the waypoints.

In addition, the waypoint determination unit may determine waypoints such that a linear tour distance obtained by connecting the reference point and the waypoints with a straight line becomes shorter than the target route distance.

In addition, the tour route generating apparatus may further include a display control unit which causes a display unit to display a map display screen in which the tour route is superimposed on a map.

In addition, the display control unit may cause the display unit to display POI information around the tour route on the map display screen.

In addition, the tour route generating apparatus may further include a navigation unit which guides a way along the tour route.

According to another embodiment of the present disclosure, there is provided a tour route generating method including: obtaining a target route distance of a tour route to be generated; obtaining a reference point as a start point of the tour route; determining a waypoint of the tour route; and generating the tour route such that a route distance from the reference point to the reference point via the waypoint becomes the target route distance.

According to still another embodiment of the present disclosure, there is provided a program which causes a computer to function as a tour route generating apparatus including: a distance obtaining unit which obtains a target route distance of a tour route to be generated; a reference point obtaining unit which obtains a reference point as a start point of the tour route; a waypoint determination unit which determines a waypoint of the tour route; and a tour route generating unit which generates the tour route such that a route distance from the reference point to the reference point via the waypoint becomes the target route distance.

As described above, a user can generate a tour route from a start point without designation of a destination according to the present disclosure.

DETAILED DESCRIPTION OF EMBODIMENTS

Figure 1:
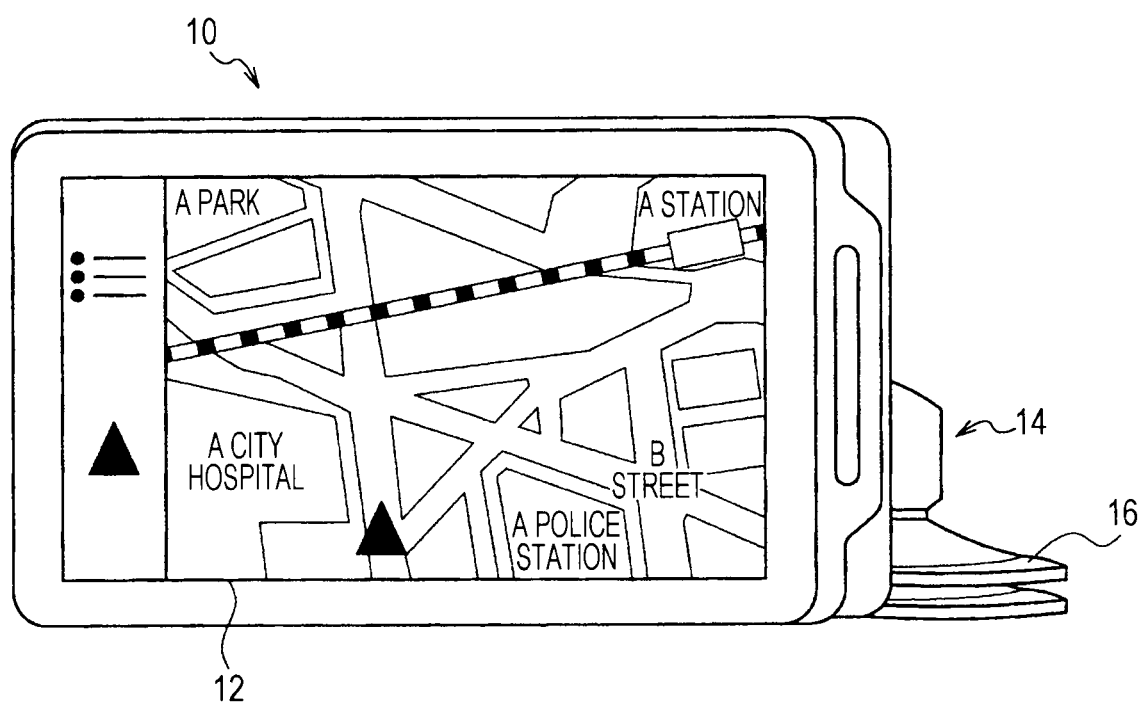
FIG. 1 is a diagram showing an appearance of a PND according to an embodiment of the present disclosure.

Hereinafter, detailed description will be given of preferable embodiments of the present disclosure with reference to the accompanying drawings. In addition, the same reference numerals are added to components with substantially the same functional configurations in this specification and drawings, and the description thereof will not be repeated.

In addition, description will be given in the following order.
1. Configuration of PND
2. Operations and screen shift of PND
3. Outline of tour route generating processing
4. Details of tour route generating processing
5. Application example to a mobile phone <1. Configuration of PND>

Figure 2:
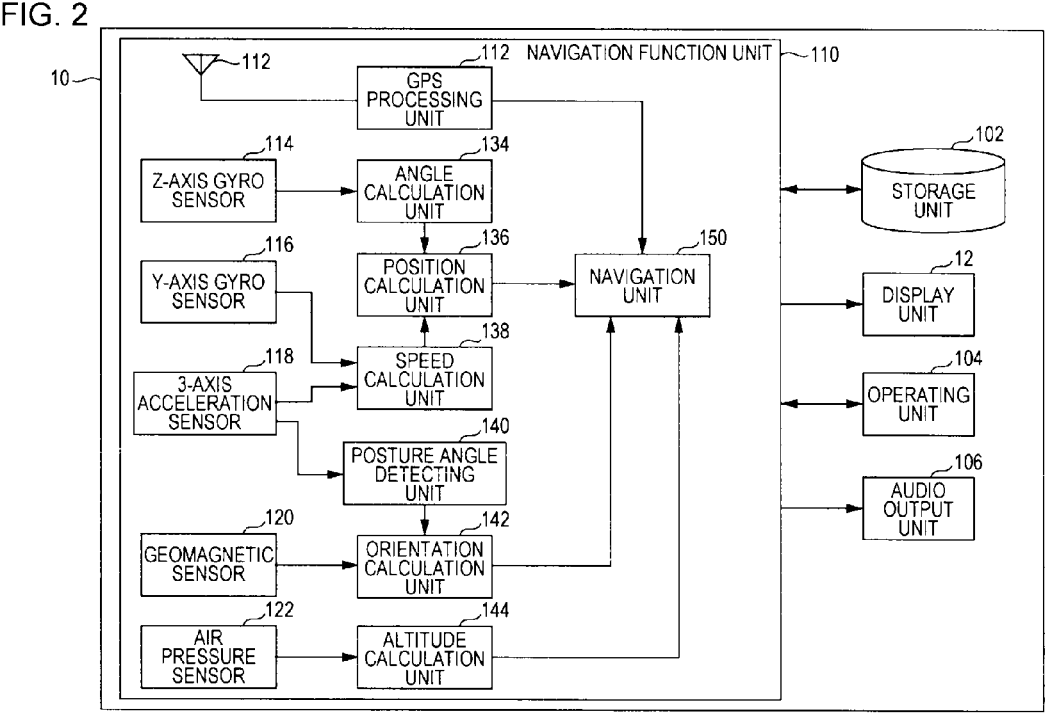
FIG. 2 is a block diagram showing a functional configuration of a PND.
Figure 3:
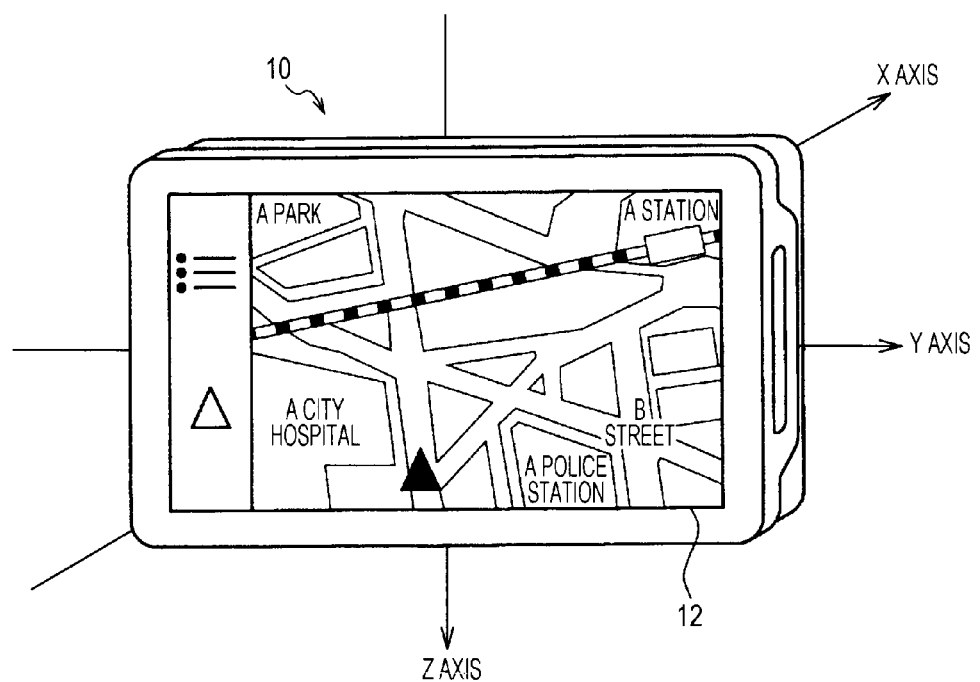
FIG. 3 is an explanatory diagram showing a coordinate system around a PND.
Figure 4:
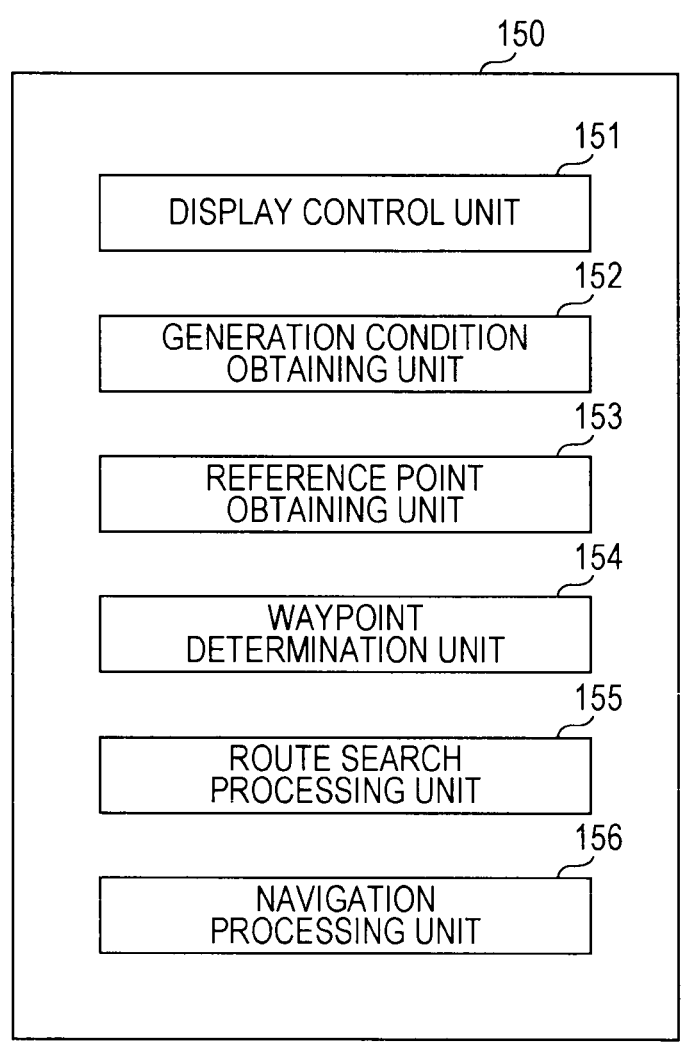
FIG. 4 is a block diagram showing a detailed functional configuration of a navigation unit of a PND.

First, description will be given of a configuration of a PND as one example of a navigation device according to an embodiment of the present disclosure with reference to FIGS. 1 to 4. FIG. 1 is a diagram showing an appearance of a PND according to an embodiment of the present disclosure. FIG. 2 is a block diagram showing a functional configuration of a PND. FIG. 3 is an explanatory diagram showing a coordinate system around a PND. FIG. 4 is a block diagram showing a detailed functional configuration of a navigation unit of a PND.

Referring to FIG. 1, one example of an appearance of a PND 10 as an example of a tour route generating device according to an embodiment of the present disclosure is shown. The PND 10 has a navigation function of guiding a route to a destination and a function of providing various kinds of information associated with positional information to a user. The PND 10 is provided with a display unit 12, which displays an image including an information providing screen for various kinds of information, on the front surface thereof, and the case body thereof is held by a cradle 14 attached to a dashboard of a vehicle via a suction disc 16. The PND 10 can easily be attached and detached.

The PND 10 has a function of obtaining a current position information of the PND 10 itself and stores map data. Accordingly, the PND 10 can display the current position information superimposed on a map on the display unit 12. According to this embodiment, it is not necessary for a user to designate a destination, and the PND 10 generates a tour route from a reference point as a starting point to the reference point via a waypoint. Although description will be given of a case in which the current position is set as a start point in this embodiment, the present disclosure is not limited such an example. For example, a point which is designated by a user may be set as a start point.

The functional configuration of the PND 10 will be described with reference to FIG. 2. The PND 10 mainly includes a display unit 12, a storage unit 102, an operating unit 104, an audio output unit 106, and a navigation function unit 110.

The navigation function unit 110 mainly includes a GPS antenna 112, a Z-axis gyro sensor 114, a Y-axis gyro sensor 116, a 3-axis acceleration sensor 118, a geomagnetic sensor 120, a barometric pressure sensor 122, a GPS processing unit 132, an angle calculation unit 134, a position calculation unit 136, a speed calculation unit 138, a posture angle detecting unit 140, an orientation calculation unit 142, an altitude calculation unit 144 and a navigation unit 150.

The display unit 12 is a display apparatus which outputs a screen in which information indicating a current position is superimposed on map data, for example. In this embodiment, the display unit 12 outputs a screen in which a generated tour route is superimposed on map data. This display unit 12 may be a display apparatus such as a liquid crystal display (LCD), an organic Electroluminescence (EL) display, or the like.

The storage unit 102 is a recording medium which records a program for operating the PND 10, map data, and the like. The storage unit 102 may be a storage medium such as a nonvolatile memory including a Flash ROM (or a Flash Memory), an Electrically Erasable Programmable Read-Only Memory (EEPROM), an Erasable Programmable ROM (EPROM) or the like, a magnetic disc including a hard disk, a disc-shaped magnetic disk, or the like, an optical disc including a Compact Disc (CD), a Digital Versatile Disc Recordable (DVD-R), a Blu-Ray Disc (BD, registered trademark), or the like, an Magneto Optical (MO) disc, or the like.

The operating unit 104 receives an operation instruction by a user and outputs the contents of the operation to the navigation function unit 110. As the operation instruction by the user, setting of a destination, enlargement and contraction of a map, audio guide setting, screen display setting, and the like are exemplified. This operating unit 104 may be a touch screen integrally provided with the display unit 12. Alternatively, the operating unit 104 may have a physical configuration such as a button, a switch, a lever, and the like, which are separately provided from the display unit 12. In addition, the operating unit 104 may be a signal receiving unit which detects a signal indicating the operation instruction by the user sent from a remote controller.

The audio output unit 106 is an output apparatus which outputs audio data and may be a speaker, for example. The audio output unit 106 outputs audio guidance relating to navigation, for example. It is possible for the user to know the correct route by listening to this audio guidance without viewing the display unit 12.

The GPS antenna 112 can receive GPS signals from a plurality of GPS satellites and input the received GPS signals to the GPS processing unit 132. In addition, the GPS signals received here include orbit data indicating orbits of the GPS satellites and information such as signal transmission time and the like.

The GPS processing unit 132 calculates positional information indicating the current position of the PND 10 based on the plurality of GPS signals input from the GPS antenna 112 and supplies the calculated positional information to the navigation unit 150. Specifically, the GPS processing unit 132 calculates a position of each satellite from the orbit data obtained by demodulating each of the plurality of GPS signals and calculates the distance between each GPS satellite to the PND 10 from the difference between the transmission time and the reception time of the GPS signals. Then, a current three-dimensional position is calculated based on the calculated position of each satellite and the distance from each satellite to the PND 10.

The navigation function unit 110 has a relative position obtaining function using various sensors as well as the above absolute position obtaining function by the GPS antenna 112 and the GPS processing unit 132. This relative position information may be used in a state where the absolute position is not obtained, namely a state where the PND 10 is present at a position where a GPS signal is not received. Alternatively, the relative position information may be used along with the absolute position information.

The Z axis gyro sensor 114 is a sensor with a function of detecting a yaw rate $\omega_z$, which is a velocity (angular velocity) at which a rotation angle around the Z axis changes when the PND 10 is revolving, as a voltage value. The Z axis gyro sensor 114 detects the yaw rate at a sampling frequency of 50 Hz, for example, and input the data indicating the detected yaw rate to the angle calculation unit 134. As shown in FIG. 3, the Z axis corresponds to a vertical direction. In addition, the X axis corresponds to a traveling direction of the PND 10 while the Y axis corresponds to a horizontal direction perpendicular to the X axis.

The angle calculation unit 134 integrates a sampling frequency (0.02 s here, for example) to the yaw rate $\omega_z$ input from the Z-axis gyro sensor 114 to calculate an angle $\theta$ when the PND 10 is revolving and inputs the angle data indicating the angle $\theta$ to the position calculation unit 136.

The Y-axis gyro sensor 116 is a sensor with a function of detecting a pitch rate $\omega_y$, which is an angular velocity around the Y axis, as a voltage value. The Y-axis gyro sensor 116 detects the pitch rate at a sampling frequency of 50 Hz, for example, and inputs data indicating the detected pitch rate to the speed calculation unit 138.

The 3-axis acceleration sensor is a sensor with a function of detecting each of an acceleration component $\alpha_x$ along the X axis, an acceleration component $\alpha_y$ along the Y axis, and an acceleration component $\alpha_z$ along the Z axis as a voltage value. The 3-axis acceleration sensor detects the x-axis acceleration component $\alpha_x$, the y-axis acceleration component $\alpha_y$, and the z-axis acceleration component $\alpha_z$ at a sampling frequency of 50 Hz and inputs data indicating the detected acceleration rates to the speed calculation unit 138 and the posture angle detecting unit 140.

The speed calculation unit 138 calculates a velocity V with respect to the traveling direction 50 times per second, for example, by dividing the acceleration component $\alpha_z$ along the Z direction input from the 3-axis acceleration sensor by the pitch rate $\omega_y$ input from the Y-axis gyro sensor 116 and inputs the calculated velocity V to the position calculation unit 136.

The position calculation unit 136 has a function of calculating positional information for a current position based on the velocity V calculated by the speed calculation unit 138 and the angle $\theta$ calculated by the angle calculation unit 134. Specifically, the position calculation unit 136 obtains a change amount from the position at the time of the previous calculation to the current position based on the velocity V and the angle $\theta$. Then, the position calculation unit 136 calculates the current position information from this change amount and the previous position. Thereafter, the position calculation unit 136 supplies the positional information for the current position to the navigation unit 150.

The posture angle detecting unit 140 firstly performs predetermined posture angle detecting processing based on the acceleration rate data $\alpha_x$, $\alpha_y$, and $\alpha_z$ input from the 3-axis acceleration sensor to generate posture angle data indicating a posture angle of the PND 10 and inputs the posture angle data to the orientation calculation unit 142.

The geomagnetic sensor is a sensor which detects each of geomagnetism $M_x$, $M_y$, and $M_z$ in the X axis direction, the Y axis direction, and the Z axis direction as a voltage value. The geomagnetic sensor inputs the detected geomagnetic data $M_x$, $M_y$, and $M_z$ to the orientation calculation unit 142.

The orientation calculation unit 142 performs predetermined correction processing on the geomagnetic data $M_x$, $M_y$, and $M_z$ input from the geomagnetic sensor and generates orientation data indicating the orientation of the PND 10 based on the corrected geomagnetic data and the posture angle data input from the posture angle detecting unit 140. The orientation calculation unit 142 supplies the generated orientation data to the navigation unit 150.

That is, the geomagnetic sensor, the 3-axis acceleration sensor, the posture angle detecting unit 140, and the orientation calculation unit 142 can function as a so-called electronic compass and generate orientation data. The navigation unit 150 can provide map data displayed in accordance with the direction of the PND 10 to the user with the use of this orientation data mainly when the PND 10 is used while being separated from the cradle 14 (when the PND 10 is used during walking, for example). In addition, the PND 10 can associate roads in the map data with the position of the vehicle based on the route of the position of the vehicle and provide map data in accordance with the direction of the PND 10 to a user based on the orientation in the map when the PND 10 is used while being mounted on the vehicle. Alternatively, it is also possible to calculate the direction of the PND 10 from the obtained GPS orientation and provide map data in accordance with the direction to the user.

The barometric pressure sensor 122 is a sensor with a function of detecting circumferential air pressure as a voltage value. The air pressure sensor 122 detects the barometric pressure at a sampling frequency of 50 Hz, for example, and inputs the detected air pressure data to the altitude calculation unit 144.

The altitude calculation unit 144 calculates the altitude of the PND 10 based on the air pressure data input from the air pressure sensor 122 and supplies the calculated altitude data to the navigation unit 150.

With the above configuration, the navigation unit 150 can obtain the current position information from the GPS processing unit 132 or the position calculation unit 136 and further obtain the orientation toward which the PND 10 directs from the orientation calculation unit 142 and the altitude of the PND 10 from the altitude calculation unit 144. Although the navigation unit 150 can use the information relating to the obtained position as it is, it is also possible to perform various corrections. For example, as a typical example of such correction processing, map matching processing can be exemplified. The map matching processing is a method using map information for correcting errors in the position information. In the map matching processing, a corresponding road on the map is searched from the change in the position information, correct positional information is estimated, and the position information is corrected based on the estimation.

Here, more detailed description will be given of main functions of the navigation unit 150 with reference to FIG. 4. The navigation unit 150 mainly includes a display control unit 151, a route generation condition obtaining unit 152, a reference point obtaining unit 153, a waypoint determination unit 154, a route search processing unit 155, and a navigation processing unit 156.

The display control unit 151 has a function of generating a display screen to be provided to the user and causing the display unit 12 to display the display screen. The display control unit 151 displays a screen in which an icon indicating a current position of the PND 10 is superimposed on a map. In addition, the display control unit 151 can also display a menu screen relating to the navigation and various setting screens. Particularly, the display control unit 151 can also display a screen in which conditions for generating a tour route (for example, transportation form of a user and a purpose of the user) are selected and a screen in which the generated tour route is superimposed on a map. Here, the display control unit 151 may further display Point of Interest (POI) information on the surrounding of the tour route superimposed on the map in the screen in which the generated tour route is superimposed on the map.

The generation condition obtaining unit 152 obtains generation conditions for generating a tour route. For example, the generation condition obtaining unit 152 functions as a distance obtaining unit which obtains a target route distance of the generated tour route. This distance obtaining unit may obtain a distance input by the user with the use of the operating unit 104 in the screen which is for selecting generation conditions. Alternatively, the distance obtaining unit may obtain the target route distance by converting the generation condition input based on the traveling time, calories, or the like, which is different from a distance, into a distance. At this time, the distance obtaining unit can convert the value of the traveling time or the calories into a distance on the basis corresponding to the transportation form (a velocity, for example). If a value of movement velocity of each user is known in advance, the distance obtaining unit may use this value. When the PND 10 maintains statistics of an average movement velocity for each user, for example, such movement velocity value may be the statistical value. Alternatively, the movement velocity value may be a value set in advance by the user as a setting value.

Furthermore, the generation condition obtaining unit 152 also functions as a request obtaining unit or a purpose obtaining unit which obtains a user request with respect to the tour route to be generated or a purpose of the user who moves along the tour route. For example, it is possible to exemplify "bicycle riding", "weight loss", "relaxation", "temple visiting", and the like as the request or the purpose of the user.

The reference point obtaining unit 153 obtains a reference point as a start point of the tour route to be generated. The reference point obtaining unit 153 can be set a current position of the PND 10 as a reference point, for example. Alternatively, the reference point obtaining unit 153 can set a point input by the user with the use of the operating unit 104 to a reference point. When the current position is set as the reference point, the user of the PND 10 can constantly obtain the tour route from the position where the user is at that time. Alternatively, when a point designated by the user is set as the reference point, it may be possible to use the tour route for scheduling the movement in the future. For example, it is possible to create an action plan of a day during traveling by generating a tour route from accommodation during traveling. Hereinafter, description will be given of a case in which a current position is set as the reference point.

The waypoint determination unit 154 has a function of determining a waypoint of a tour route. The waypoint determination unit 154 firstly determines a waypoint such that the linear tour distance of a linear tour route as a tour route connecting a reference point and a waypoint with a straight line is shorter than a target route distance. The waypoint is determined here without considering the attribute of the point (over the sea, on a road, in an establishment, in a park, or the like). For this reason, the waypoint determination unit 154 may correct the waypoint to a point, through which the user can actually go, such as a point in an establishment, a point on a road, or the like by nearest search or close link search processing using the map data. In addition, the waypoint determination unit 154 may determine a plurality of waypoints. Here, the waypoint determination unit 154 may determine the waypoints such that the position of a firstly determined waypoint becomes different every time a tour route is generated. In so doing, a different route is generated every time, and therefore, the user can obtain a new route every time a tour route is generated. At this time the waypoint determination unit 154 may determine waypoints based on the purpose of the user. When the purpose of the user is to visit temples, for example, temples may be set as waypoints. When the purpose of the user is relaxation, a hill with a good view may be set as a waypoint. A specific method by which the waypoint determination unit 154 determines a waypoint will be described later.

The route search processing unit 155 has a function of searching for a route connecting a plurality of points. The route search processing unit 155 can search for a route from a current position to a destination, for example. In this embodiment, the route search processing unit 155 also functions as a tour route generating unit which generates a tour route such that the route distance from a reference point obtained by the reference point obtaining unit 153 to the reference point via a waypoint determined by the waypoint determination unit 154 becomes a target route distance, based on the generation conditions obtained by the generation condition obtaining unit 152. The route search processing unit 155 searches for a route between the reference point and the waypoint or a route between the waypoints. At this time, the route search processing unit 155 searches for each route such that the route distance of the tour route becomes the target tour route. In addition, the route search processing unit 155 may search for each route in accordance with the purpose of the user. When the purpose of the user is dieting, for example, the route search processing unit 155 may search for a route in which there are a lot of uphill roads. When the purpose of the user is relaxation, the route search processing unit 155 may search for a route traveling along a road with a good view.

The navigation processing unit 156 has a function of guiding a user along a route from a current position to a destination, or a generated tour route. For example, the navigation processing unit 156 can guide the user along the route by causing the display control unit 151 to display a display screen in which the route of the guide is superimposed on a map. Alternatively, the navigation processing unit 156 can guide the user along the route by causing the audio output unit 106 to output audio for guiding the user along the route. For example, the navigation processing unit 156 can output audio for prompting the user to turn right or turn left in order to show the way to be chosen by the user at an intersection.

The above description was made of one example of the functions of the PND 10 according to an embodiment. Each of the above components may be configured with the use of general members or circuits or may be configured with hardware specialized to a function of each component. Alternatively, the function of each component may be executed by reading a control program from a recording medium such as a Read Only Memory (ROM), a Random Access Memory (RAM), or the like, which stores the control program in which processing procedures for realizing such functions are described, and interpreting the program by a computation apparatus such as a Central Processing Unit (CPU) or the like. Accordingly, it is possible to appropriately change the configuration to be used in accordance with the technical level at the time of performing this embodiment.

In addition, it is possible to produce a computer program which realizes each function of the PND 10 according to this embodiment as described above and mount the computer program on a personal computer or the like. In addition, it is also possible to provide a computer-readable recording medium on which such a computer program is stored. The recording medium may be a magnetic disk, an optical disc, a magneto-optical disc, a flash memory, or the like. In addition, the computer program may be distributed via a network, for example, without using a recording medium.

<2. Operations and Screen Shift of PND>

Figure 5:
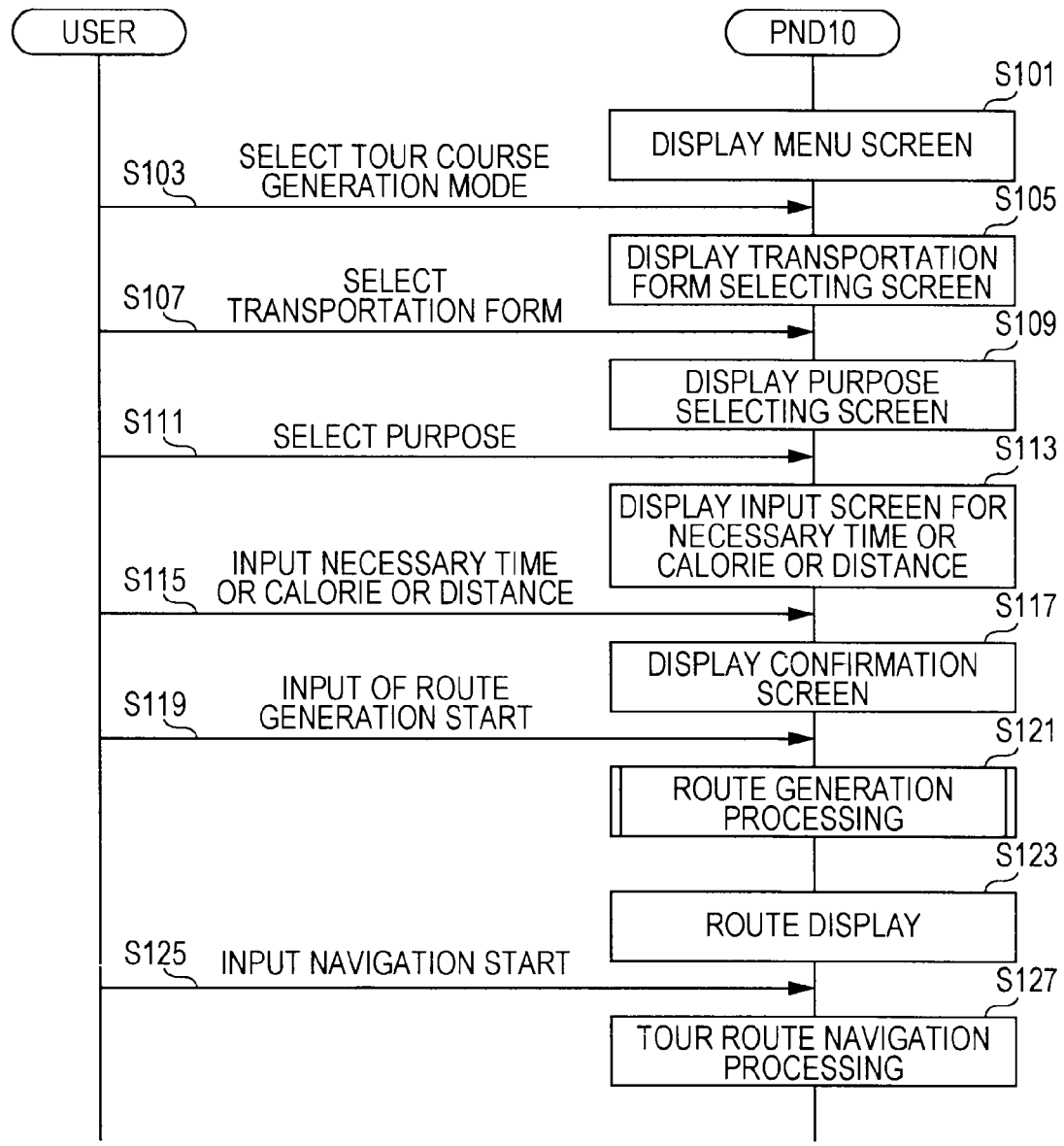
FIG. 5 is a sequence diagram showing operations until the start of navigation of a PND.
Figure 6:
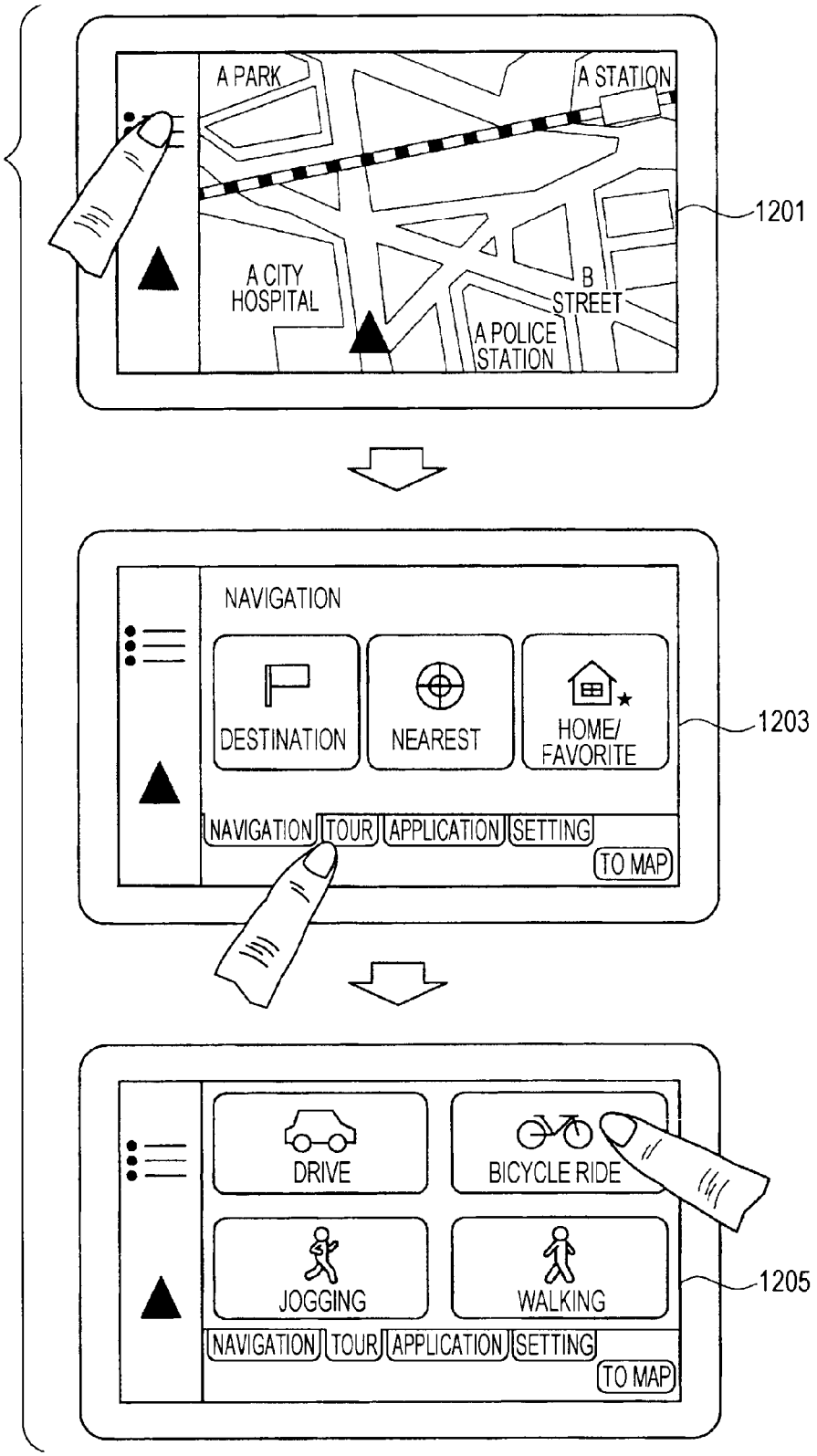
FIG. 6 is an explanatory diagram showing screen shift of a PND.
Figure 7:
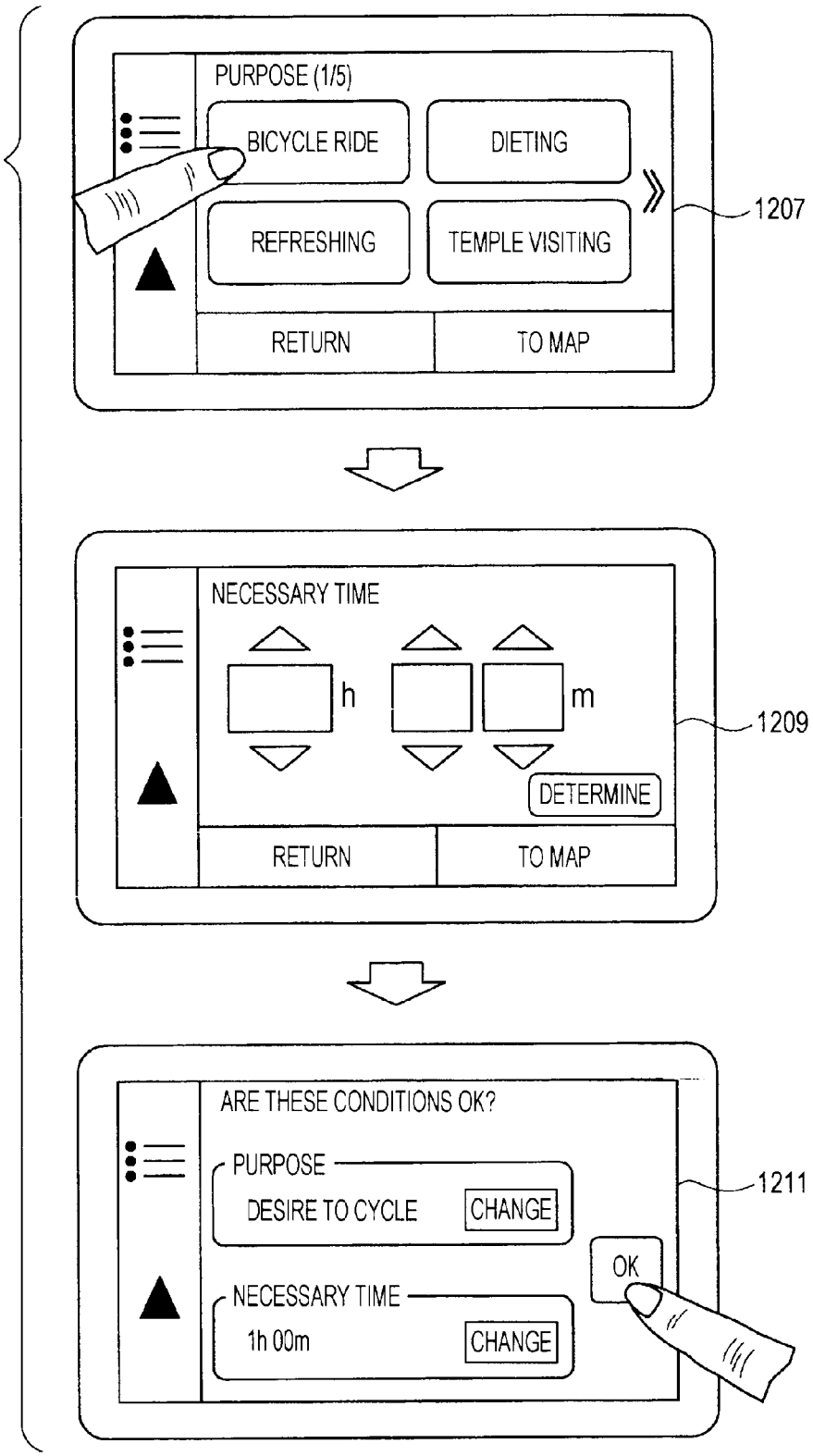
FIG. 7 is an explanatory diagram showing screen shift of a PND.
Figure 8:
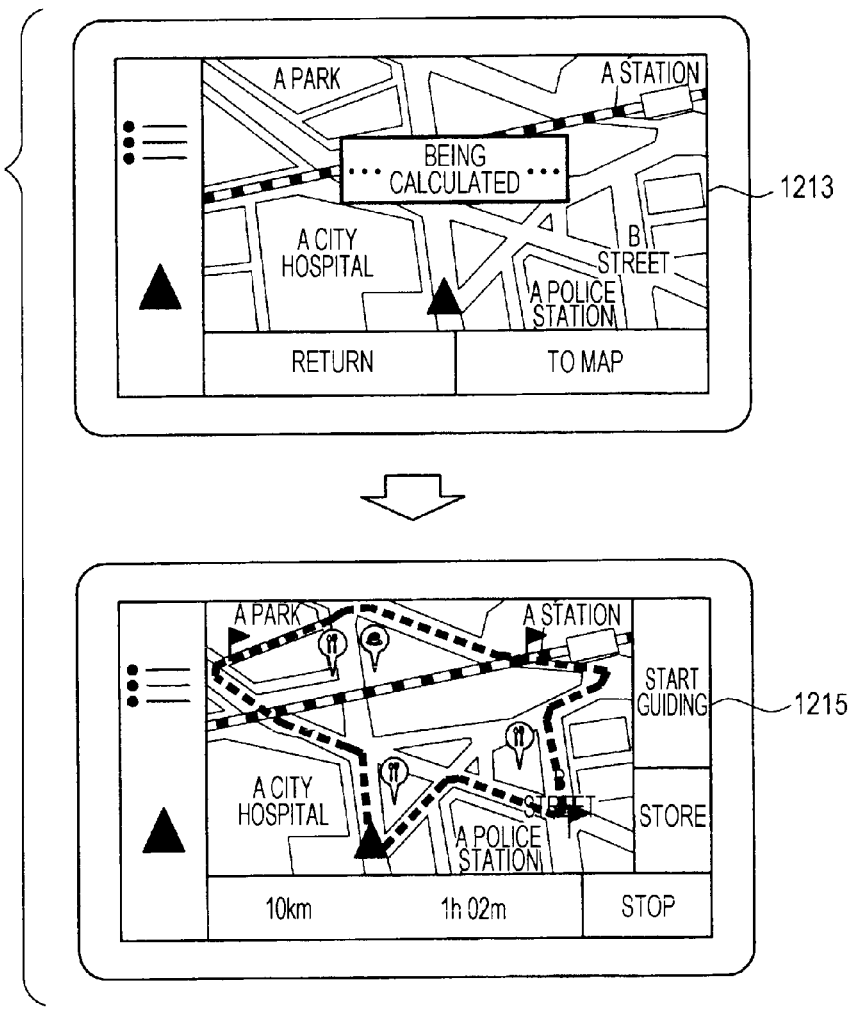
FIG. 8 is an explanatory diagram showing screen shift of a PND.

Next, description will be made of the operations and the screen shift of the PND 10 according to this embodiment with reference to FIGS. 5 to 8. FIG. 5 is a sequence diagram showing operations until the start of navigation of the PND. FIGS. 6 to 8 are explanatory diagrams showing screen shift of the PND.

For example, the user performs an operation for displaying a menu screen on the map display screen 1201 in FIG. 6. The display control unit 151 displays a menu screen 1203 (S101). If the user selects a tab for tour course generation mode on the menu screen 1203 (S103), the display control unit 151 then displays the transportation form selecting screen (S105). Here, the transportation form selecting screen includes icons, each of which represents a drive mode indicating that the user travels by car, a cycling mode indicating that the user travels by bicycle, a jogging mode indicating that the user runs and travels, and a walking mode indicating that the user walks and travels.

Here, the user selects a transportation form (S107). When the user selects an icon indicating the cycling mode, for example, the display control unit 151 displays a purpose selecting screen 1207 including icons indicating purposes which can be selected in the cycling mode (S109). When the user selects a purpose on the purpose selecting screen 1207 (S111), the display control unit 151 displays a necessary time input screen 1209 (S113). At this time, the display control unit 151 may display a necessary calorie input screen or a target route distance input screen.

The user inputs a target value for time, which is necessary to travel along the tour route, on the necessary time input screen 1209 (S115). When the user desires to know a route along which the user can come back in about 1 hour from the time point, for example, the user inputs 1 hour on the necessary time input screen 1209. The necessary time input screen 1209 may be configured such that a number is changed by pressing arrows indicating up and down and the input is finalized by pressing a finalization button in a state where a desired number is being displayed. Alternatively, the necessary time input screen 1209 may be configured such that a number in a frame is changed by the user performing a downward or upward scrolling operation while touching the touch panel of the necessary time input screen 1209 and the input is finalized by pressing the finalization button in a state where the desired number is being displayed.

When the necessary time is fixed, the display control unit 151 displays a confirmation screen 1211 for the input generation conditions (S117). Here, the confirmation screen 1211 including the input purpose and the input necessary time is displayed, and the user can finalize the generation conditions by pressing an OK button when the input value is correct. When the input value is not correct, or when the user desires to change the input value, it is also possible to change each input value by pressing a change button. That is, the user inputs the start of route generation by pressing the OK button (S119).

When the user instructs the start of route generation, the PND 10 executes route generation processing (S121). Specifically, the route generation processing includes obtaining a reference point by the reference point obtaining unit 153, determination of waypoints by the waypoint determination unit 154, and searching for each route by the route search processing unit 155. While the route generation processing is executed, the display control unit 151 may display a screen 1213 indicating that the processing is being executed shown in FIG. 8, for example. When the route generation processing is completed, the display control unit 151 displays a route display screen 1215 in which the generated tour rote is superimposed on the map. At this time, the display control unit 151 may show a current point as a reference point and the positions of the determined waypoints on the map. In FIG. 8, the waypoints are shown as icons with shapes of flags.

If an operation for the start of navigation is operated on the route display screen 1215 (S125), the navigation processing unit 156 can perform navigation processing based on the generated tour route (S127). Alternatively, the PND 10 may store the information of the generated tour route on the storage unit 102. The navigation unit 150 may store the generated route on the storage unit 102 when the user presses a save button on the route display screen 1215.

The display control unit 151 may display the confirmation screen 1211 when the user presses a stop button on the route display screen 1215, for example. If the user presses the OK button again on this confirmation screen, the waypoint determination unit 154 may determine a point, which is different from that when the tour route was previously generated, as a waypoint. It is possible to generate a route which is different from the previous route by selecting different waypoints every time as described above. For this reason, the user can obtain different tour routes every time the user performs operations even with the same generation conditions.

In addition, icons indicating the POI information near the generated tour route are displayed on the route display screen 1215. If the information relating to the establishments such as shops, parks, and the like located near the generated route is displayed, the user can refer to the displayed POI information when planning actions at the time of traveling along the generated route. If the information of restaurants near the route is displayed, for example, the user can select a point for a rest from the displayed ROI information. In addition, the display control unit 151 may select the POI information to be displayed based on the purpose of the generated route.

<3. Outline of Tour Route Generating Processing>

Figure 9:
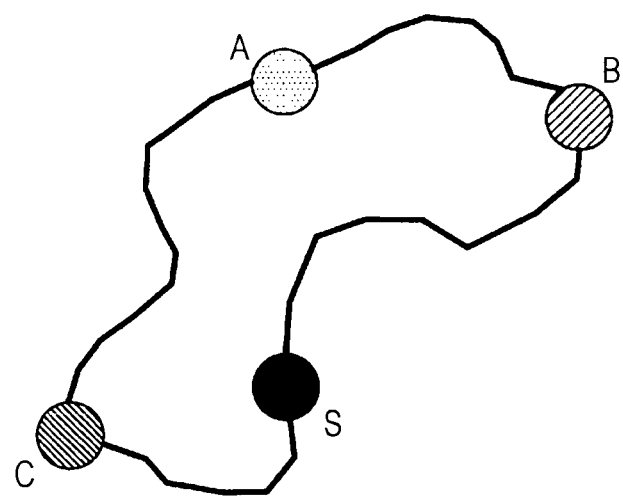
FIG. 9 is an explanatory diagram for an outline of tour route generating processing.
Figure 10:
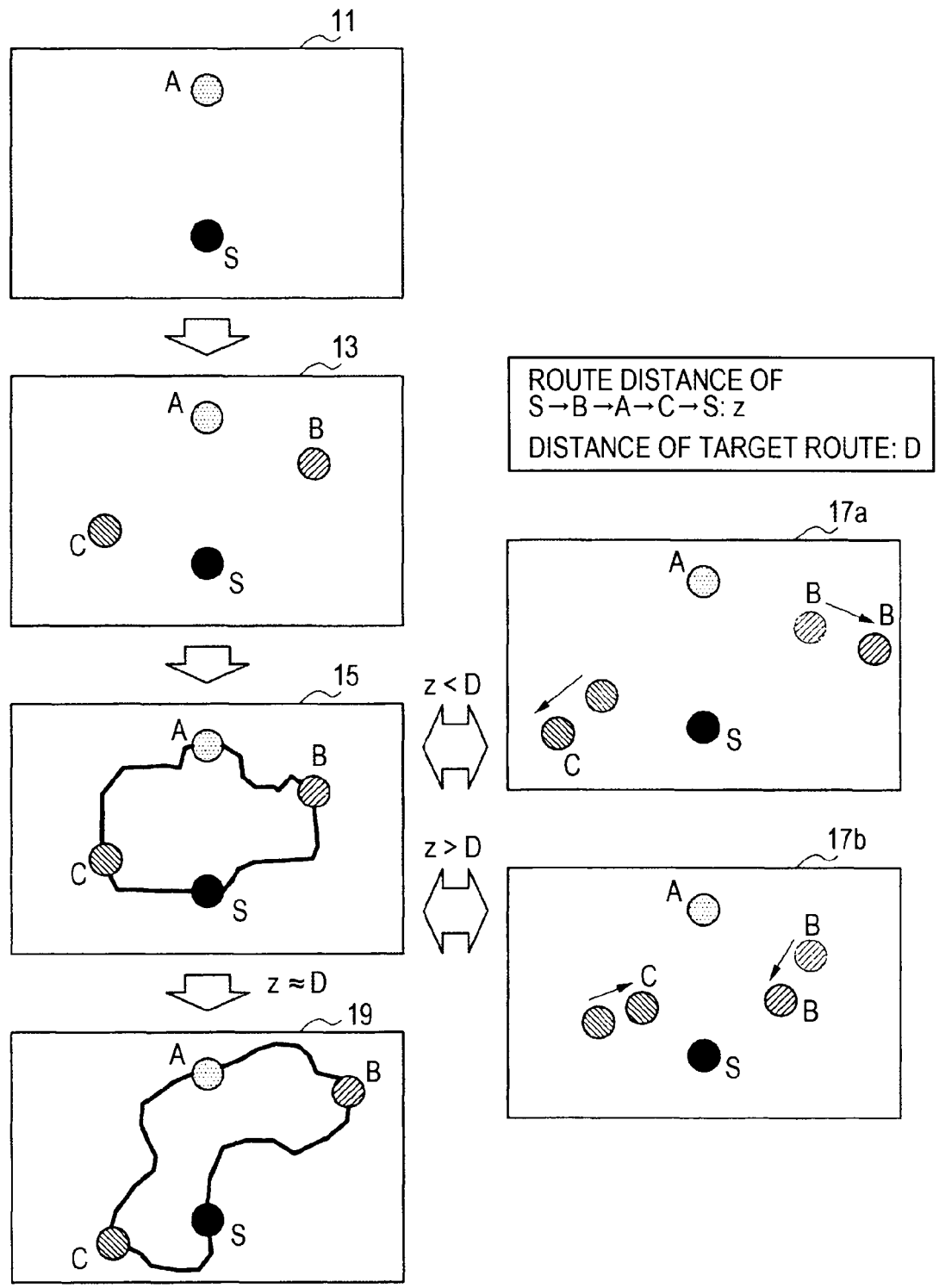
FIG. 10 is an explanatory diagram for an outline of tour route generating processing.

Next, description will be given of an outline of the tour route generating processing by the PND 10 according to this embodiment with reference to FIGS. 9 and 10. FIGS. 9 and 10 are explanatory diagrams for the outline of the tour route generating processing.

Referring to FIG. 9, the outline of the completed tour route generated in this embodiment is shown. When a current position S is set as the reference point and three waypoints A, B, and C are determined, a tour route S→B→A→C→S is generated, passing through this reference point S and the waypoints A, B, and C.

The outline of a method of generating such a tour route is as follows. First, when the reference point obtaining unit 153 obtains the current position S as a reference point, the waypoint determination unit 154 determines a waypoint A on the basis of the current position S. At this time, the waypoint determination unit 154 determines the waypoint A such that the route distance of the reference point S→the waypoint A→the reference point S is shorter than the target route distance (see the reference numeral 11 in FIG. 10). Then, the waypoint determination unit 154 determines waypoints B and C such that the waypoints B and C are positioned on mutually opposite sides with respect to a straight line SA as an axis (see the reference numeral 13).

Then, the route search processing unit 155 searches for each of the routes between S and B, between B and A, between A and C, and between C and S (see the reference numeral 15). Here, it is assumed that z represents the route distance of S→B→A→C→S obtained by summing up the route distances of the respectively searched routes and D represents the target route distance. At this time, the waypoint determination unit 154 compares the values of z and D and corrects the positions of the waypoints B and C such that the waypoints B and C become further away from each other, if z is shorter than D (see the reference numeral 17a). On the other hand, when the waypoint determination unit 154 compares the values of z and D, and z is longer than D, when the waypoint determination unit 154 corrects the positions of the waypoints B and C such that the waypoints B and C come closer to each other (see the reference numeral 17b). The waypoint determination unit 154 repeats such correction processing until the distances of z and D become substantially equal to each other (see the reference numeral 19).

The above description was made of the outline of the tour route generating processing. Here, the description was given while detailed theory was omitted for instinctive understanding of the tour route generating processing. Next, detailed description will be given of the tour route generating processing.

<4. Details of Tour Route Generating Processing>

Figure 11:
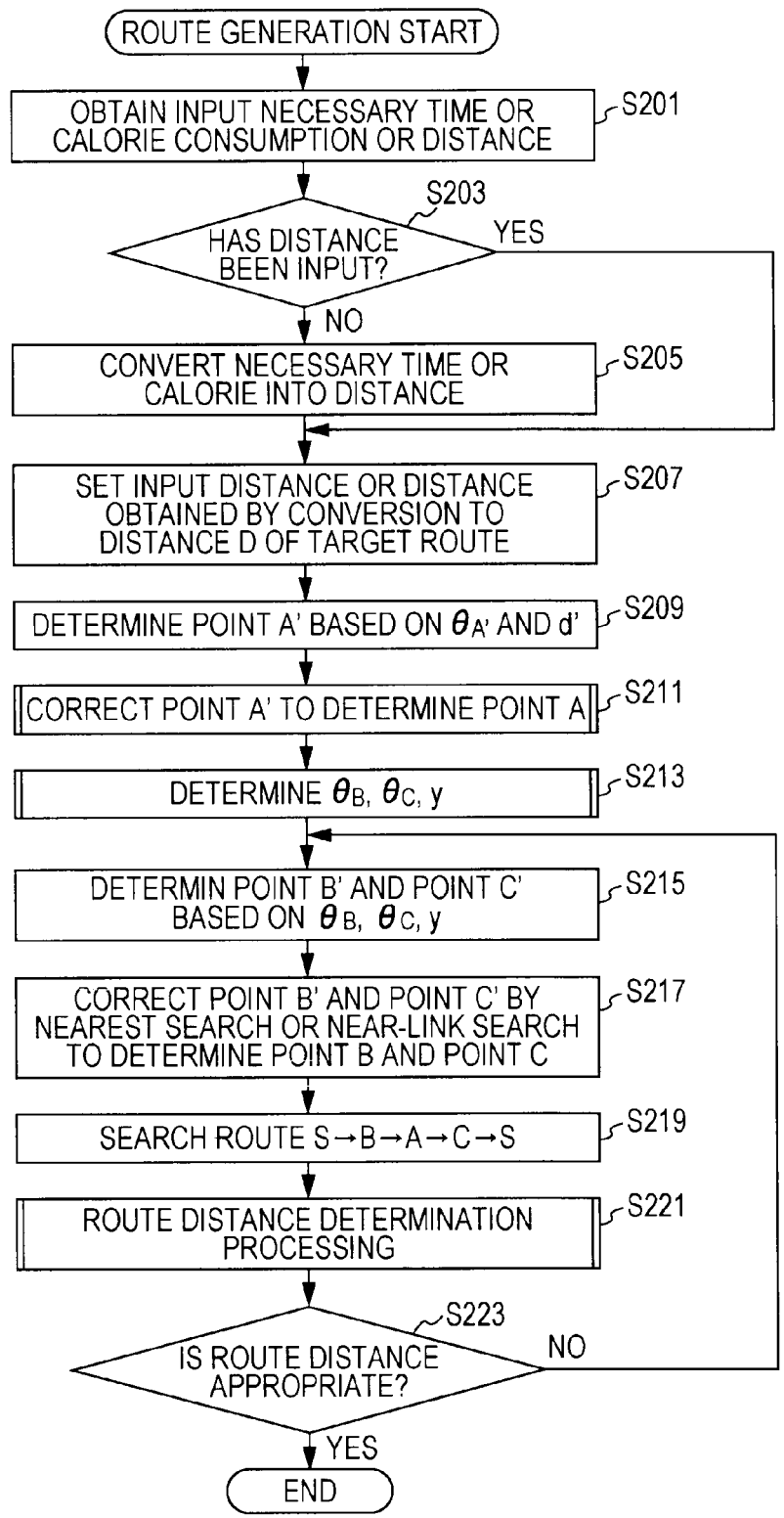
FIG. 11 is a flowchart showing one example of overall operations in tour route generating processing.
Figure 12:
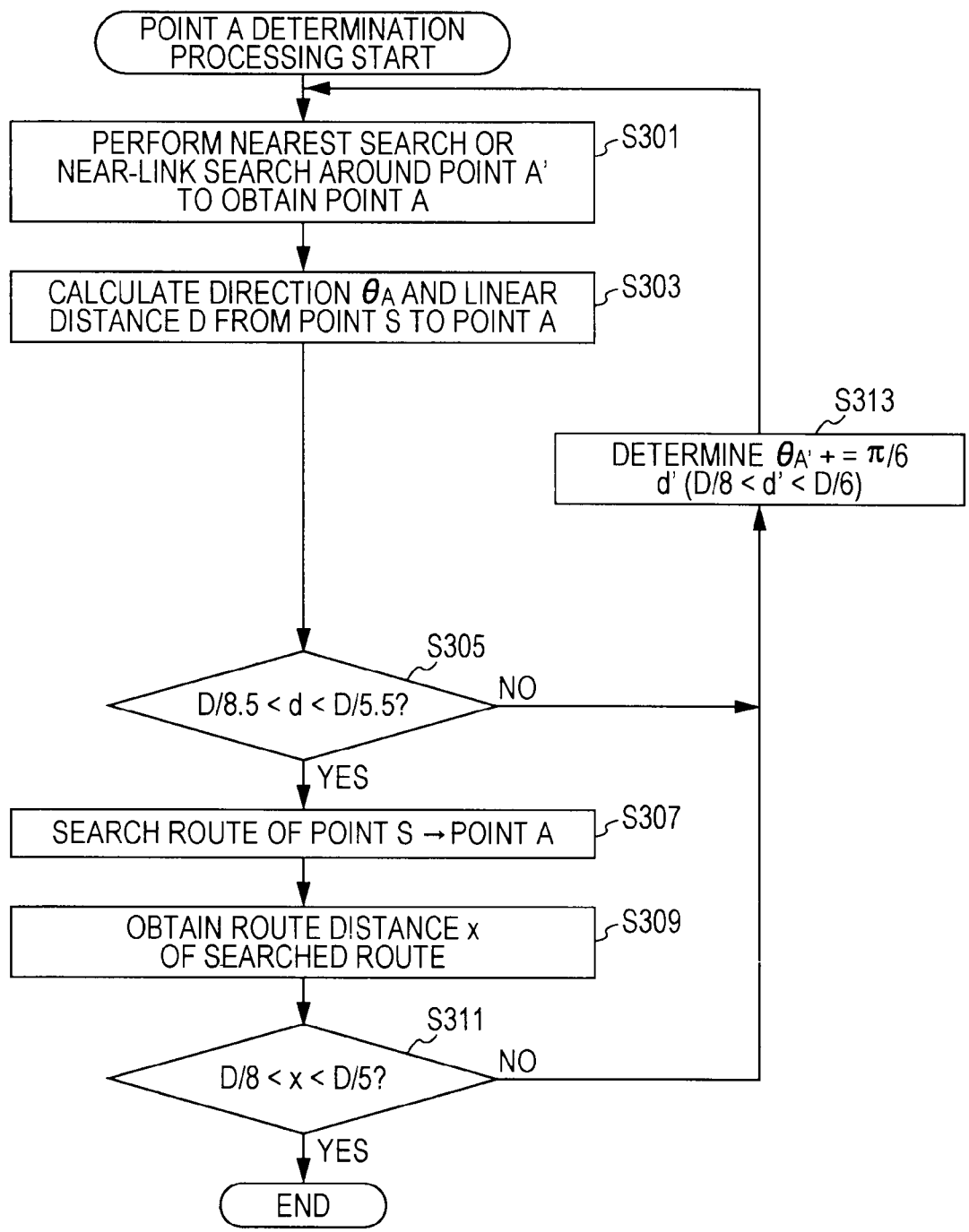
FIG. 12 is a flowchart showing one example of waypoint A determination processing.
Figure 13:
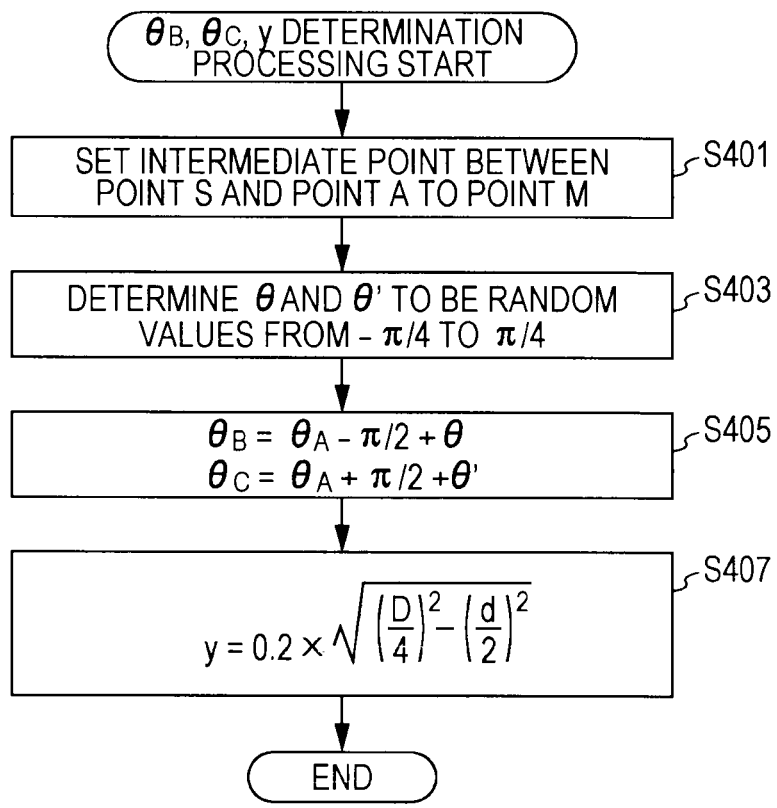
FIG. 13 is a flowchart showing one example of parameter determination processing for determining waypoints B and C.
Figure 14:
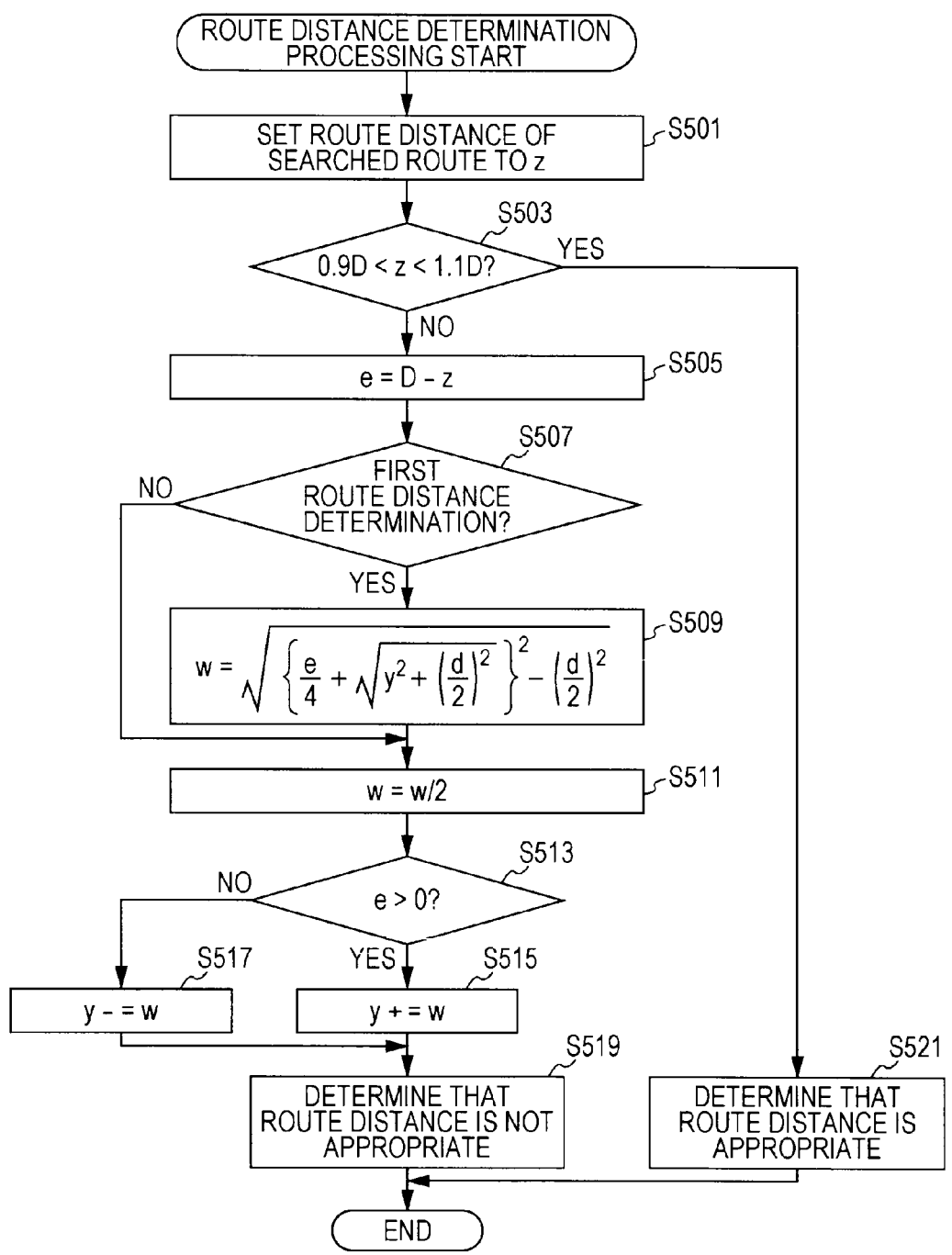
FIG. 14 is a flowchart showing one example of route distance determination processing.
Figure 15:
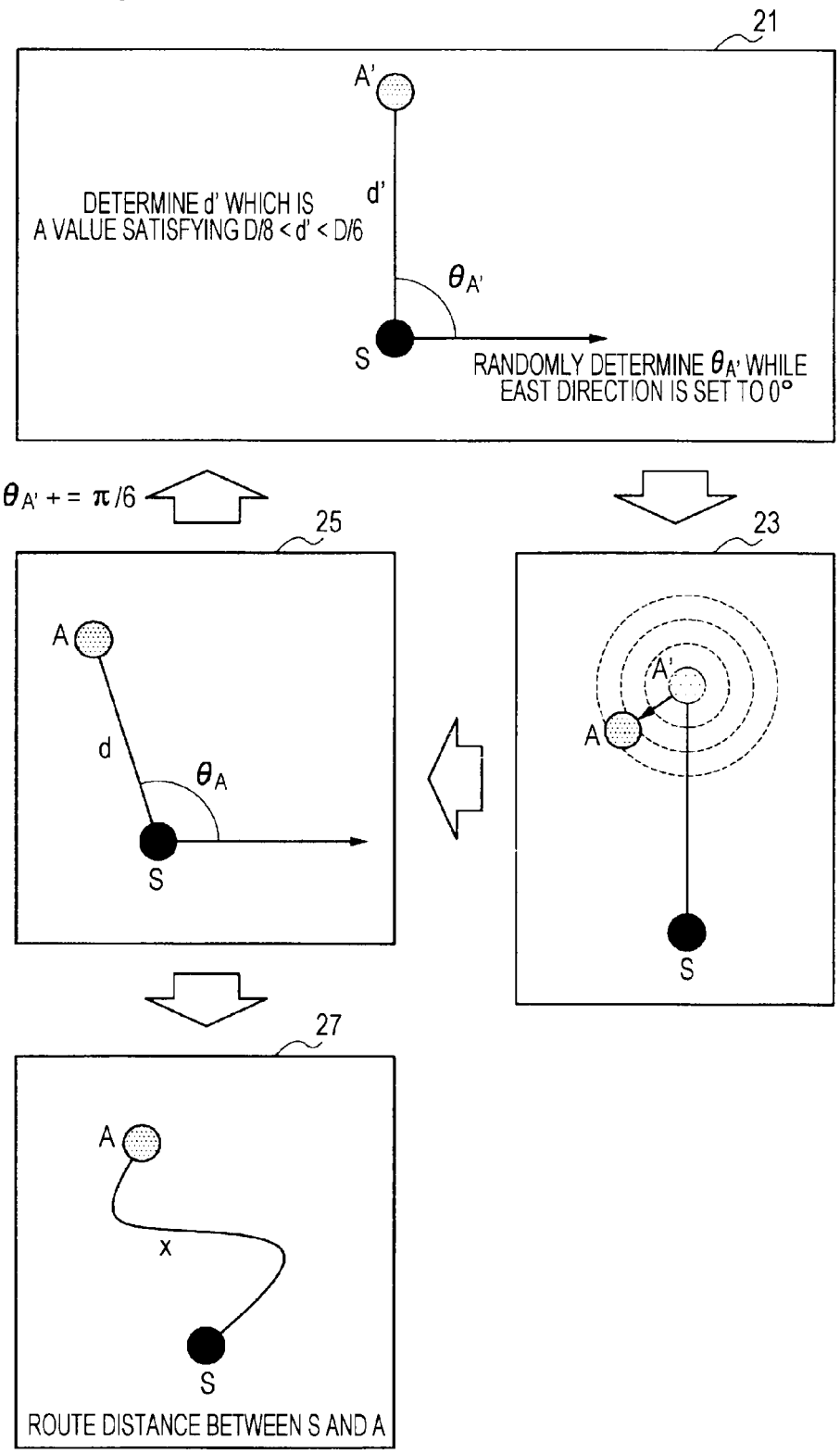
FIG. 15 is an explanatory diagram for illustrating waypoint A determination processing.
Figure 16:
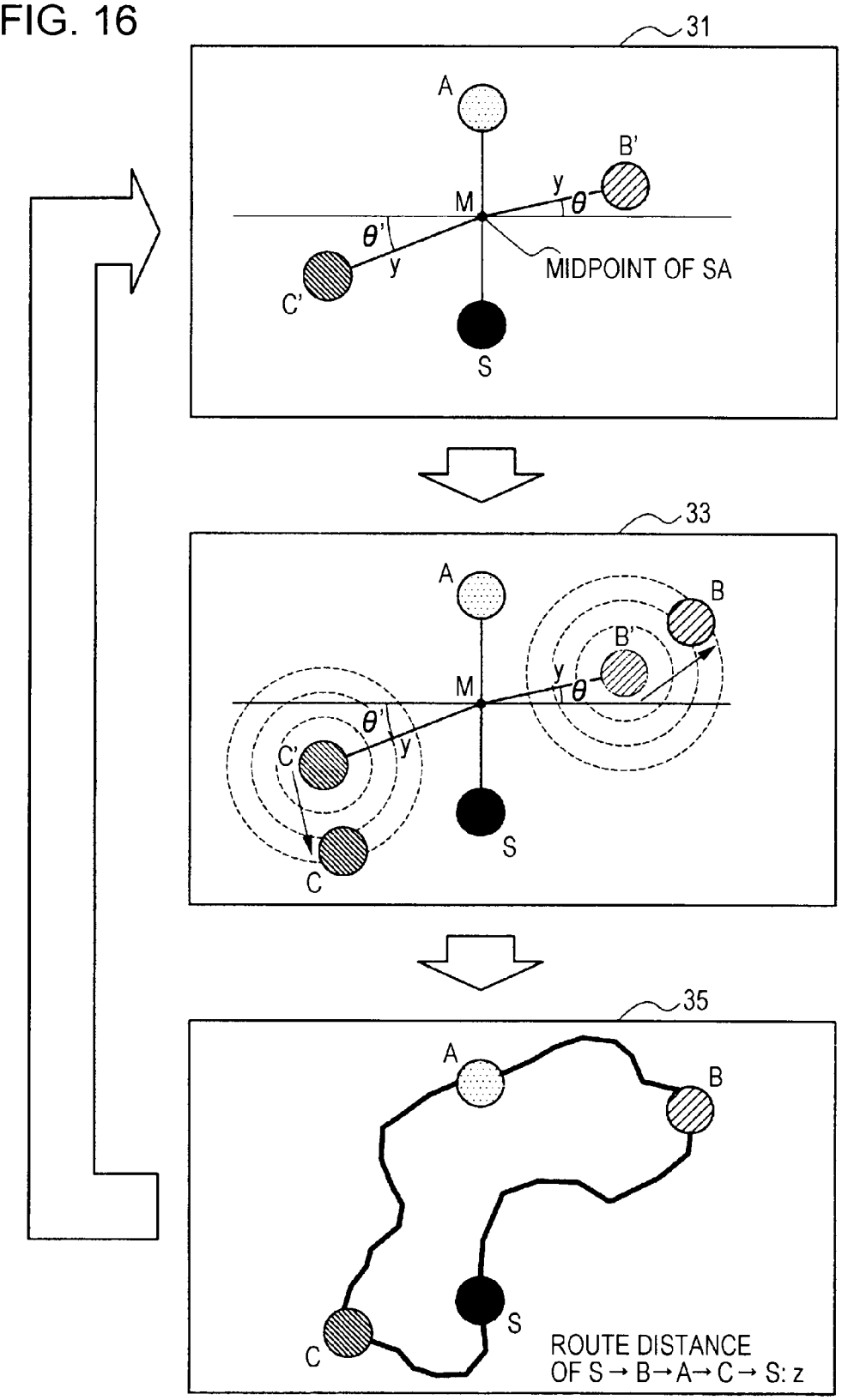
FIG. 16 is an explanatory diagram for illustrating tour route generating processing.

Next, further detailed description will be given of the tour route generating processing by the PND 10 with reference to FIGS. 11 to 16. FIG. 11 is a flowchart showing one example of overall operations in the tour route generating processing. FIG. 12 is a flowchart showing one example of waypoint A determination processing. FIG. 13 is a flowchart showing one example of parameter determination processing for determining the waypoints B and C. FIG. 14 is a flowchart showing one example of the route distance determination processing. FIG. 15 is an explanatory diagram for illustrating waypoint A determination processing. FIG. 16 is an explanatory diagram for illustrating the tour route generating processing.

First, the generation condition obtaining unit 152 obtains the input necessary time, the calorie consumption, or the distance (S201). Then, the generation condition obtaining unit 152 determines whether or not the obtained generation condition is distance (S203). When the input does not indicate the distance, that is, when the input indicates the necessary time or the calorie consumption, the generation condition obtaining unit 152 converts the obtained necessary time or the calorie consumption into a distance (S205). On the other hand, it is determined that the input indicates the distance in Step S203, the processing in Step S205 is omitted. Then, the generation condition obtaining unit 152 sets the input distance or the distance obtained by converting the necessary time or the calorie consumption to a target route distance D (S207).

Next, the waypoint determination unit 154 randomly determines an angle $\theta_{A'}$ at 0° in the east direction from the reference point S. The waypoint determination unit 154 determines a point A' which is distant away from the reference point S by a distance d' in the direction at the angle $\theta_{A'}$ (S209) (see the reference numeral 21 in FIG. 15). Here, it is preferable that d' satisfies a relation of D/6<d'<D/8.

Then, the waypoint determination unit 154 corrects the point A' to determine the waypoint A (S211). Here, the detailed processing of determining the waypoint A will be shown in FIG. 2. First, the waypoint determination unit 154 performs the nearest search or close link search processing around the point A' to determine the point A (S301) (see the reference numeral 23). Then, the waypoint determination unit 154 calculates the direction $\theta_{A'}$ from the point S to the point A and the linear distance d between the point S and the point A (S303) (see the reference numeral 25). Here, the point A is significantly corrected in the close link search processing in some cases when the point A' is a point over the sea, and the like. For this reason, it is determined whether or not the value of d is within a predetermined range of D/8.5<d<D/5.5 (S305). When it is determined that d is not a value within the predetermined range, the waypoint determination unit 154 increments the value of $\theta_{A'}$ by $\pi/6$ and determines the point A' again (S313).

On the other hand, when it is determined that d is a value within the predetermined range in Step S305, the route search processing unit 155 then searches for a route from the point S to the point A (S307). The waypoint determination unit 154 obtains a route distance x of the route searched in Step S307 (S309) (see the reference numeral 27). The waypoint determination unit 154 determines whether or not the route distance x is within a predetermined range (D/8<x<D/5) (S311). When it is determined that x is not within the predetermined range in Step S311, the process returns to Step S313, and the waypoint determination unit 154 increments the value of $\theta_{A'}$ by $\pi/6$ to determine the point A' again. On the other hand, when it is determined that x is within the predetermined range in Step S311, the point A determination processing is completed.

Referring again to FIG. 11, the waypoint determination unit 154 then determines $\theta_B$, $\theta_C$, and y (S213). Here, description will be given of detailed operations in Step S213 with reference to FIGS. 13 and 16. First, the waypoint determination unit 154 sets an intermediate point M between the point S and the point A (S401). Then, the waypoint determination unit 154 sets the angles $\theta$ and $\theta'$ to random values from $-\pi/4$ to π/4, respectively (S403). Then, $\theta_B$ and $\theta_C$ are determined based on equations of $\theta_B=\theta_A-\pi/2+\theta$ and $\theta_C=\theta_A+\pi/2+\theta'$ (S405). Here, the waypoint determination unit 154 determines y based on the equation described in Step S407. Here, the coefficient 0.2 is a value obtained based on experience, and the coefficient is not necessarily 0.2.

Referring to FIG. 11 again, the waypoint determination unit 154 then determines the point B' and the point C' based on $\theta_B$, $\theta_C$ and y (S215). That is, the waypoint determination unit 154 determines the point B' which is far away from the point M by a linear distance y in the direction $\theta_B$ and the point C' which is far way from the point M by a linear distance y in the direction $\theta_C$ (see the reference numeral 31). Here, the waypoint determination unit 154 can determine the points B' and the point C' positioned in mutually opposite directions while interposing a line connecting the reference point and the point A by determining $\theta_B$ and $\theta_C$ based on the above equations.

Then, the waypoint determination unit 154 performs the nearest search or the close link search processing around the determined point B' and the point C' to correct the point B' and the point C' and determines the point B and the point C (S217) (see the reference numeral 33). Then, the route search processing unit 155 searches for a tour route of S→B→A→C→S by respectively searching for the routes of S→B, B→A, A→C, and C→S (S219). Here, the waypoint determination unit 154 executes determination processing of determining whether or not the total z of the route distances is within an appropriate range (S221). When the route distance determination processing in Step S221 is executed, determination regarding whether or not the route distance is appropriate is output as a result of the execution. The waypoint determination unit 154 determines whether or not the route distance z is appropriate based on the execution result (S223). When it is determined that the route distance is not appropriate in Step S223, the process returns to Step S215, and the waypoint B and the waypoint C are determined again. On the other hand, when it is determined that the route distance is appropriate in Step S223, the tour route generating processing is completed.

Here, detailed description will be given of the route distance determination processing shown in Step S211 with reference to FIG. 14. First, it is assumed that z represents the route distance of the searched route (S501). Then, it is determined that the value of z is within a range of 0.9D<z<1.1D (S503). That is, the route distance is determined to be appropriate when the value of z is within the above range (S521). Here the range of the value of z is determined based on to what extent the allowable range of the error from the target route distance d is to be set.

On the other hand, when it is determined that z is not within the predetermined range in Step S503, it is determined that the route distance is not appropriate. At this time, the waypoint determination unit 154 performs the processing from Step S505 to Step S519 and prepares to determine the waypoints B and C again.

First, the waypoint determination unit 154 calculates the value of e=D−z (S505). Then, the waypoint determination unit 154 determines whether or not such route distance determination processing is the first processing (S507). When it is determined that the route distance determination processing is the first processing in Step S507, the waypoint determination unit 154 calculates the value of w based on the equation described in Step S509 (S509). On the other hand, when it is determined that the route distance determination processing is not the first processing in Step S507, the calculation in Step S509 is omitted. Then, w is set to a half value (S511).

Then, the waypoint determination unit 154 determines whether or not the value of e is a positive value (S513). When it is determined that e is a positive value in Step S513, new y is obtained by adding the value of w to y (S515). On the other hand, when it is determined that e is a negative value in Step S513, new y is obtained by subtracting the value of w from y (S517). Then, the waypoint determination unit 154 determines that the route distance is not appropriate (S519) and completes the route distance determination processing.

The above description was made of the algorithm for tour route generation. Here, the description was made of a tour route generating device which determines three waypoints and generates a tour route from a reference point to the reference point via the three waypoints. However, it is possible to change the number of waypoints. When the number of waypoints is different, it is necessary to adjust each parameter in the equations described herein. Particularly, in the equation used when the positions of waypoints are determined, the coefficient of the target route distance D is a value set based on experience. The route distance of the linear tour route connecting the waypoints and the reference point is the shortest distance in the tour route. That is, the actual route distance is longer than the route distance of the linear tour route. For this reason, the waypoint determination unit 154 determines the waypoints such that the linear tour route distance is shorter than the target route distance.

<5. Application Example to Mobile Phone>

Figure 17:
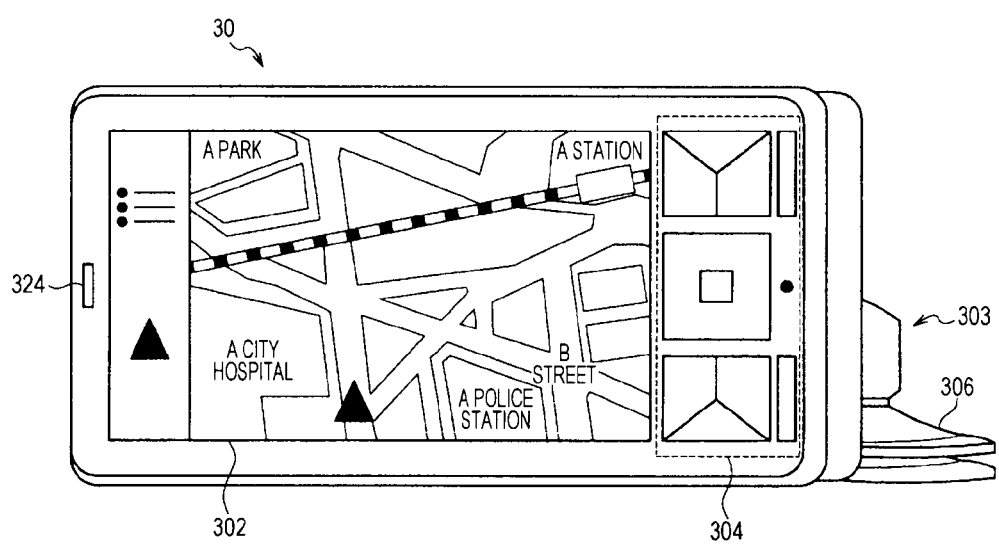
FIG. 17 is a diagram showing one example of an appearance of a mobile phone.
Figure 18:
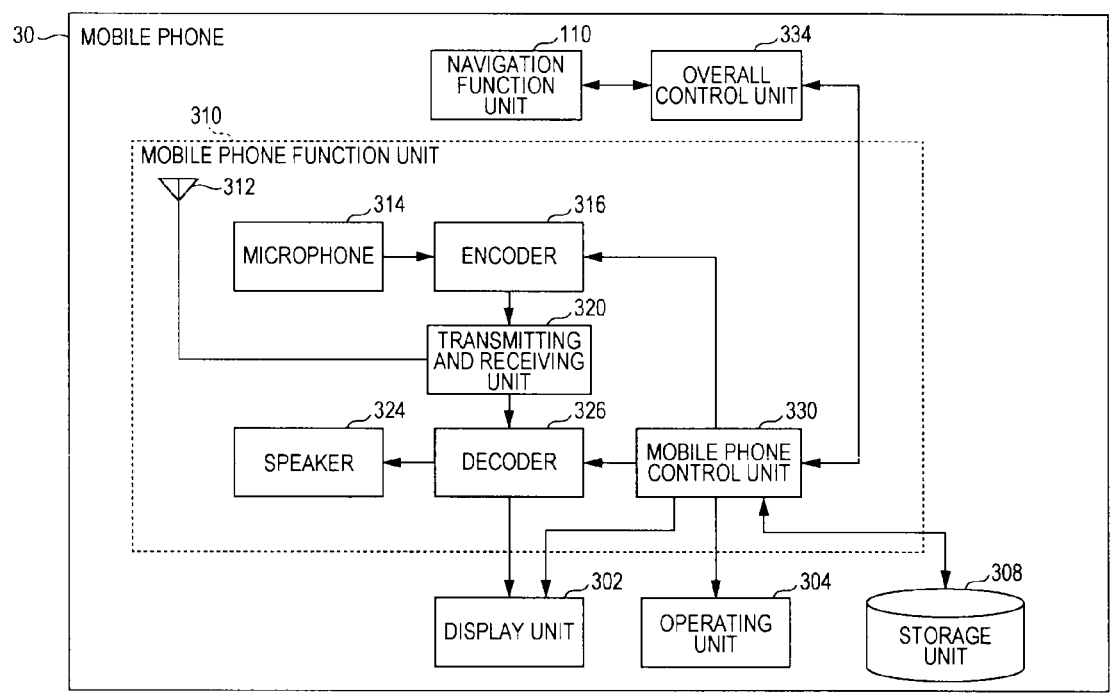
FIG. 18 is a block diagram showing one example of a functional configuration of a mobile phone.

Next, description will be made of an application example of the aforementioned tour route generating processing to a mobile phone with reference to FIGS. 17 and 18. FIG. 17 is a diagram showing one example of an appearance of a mobile phone. FIG. 18 is a block diagram showing one example of a functional configuration of a mobile phone.

As shown in FIG. 17, the mobile phone 30 includes a display unit 302, an operating unit 304, and a speaker 324. In addition, the mobile phone 30 may be attached to a vehicle by a suction disc 306 via a cradle 303 in the same manner as in the PND 10.

As shown in FIG. 18, the mobile phone 30 mainly includes a navigation function unit 110, a display unit 302, an operating unit 304, a storage unit 308, a mobile phone function unit 310, and an overall control unit 334.

The mobile phone function unit 310 is connected to the display unit 302, an operating unit 304, and the storage unit 308. In addition, the display unit 302, the operating unit 304, and the storage unit 308 are respectively connected to the navigation function unit 110 although not shown in FIG. 18 for the simplification of the drawing. In addition, the detailed configuration of the navigation function unit 110 was described above with reference to FIGS. 2 and 4, and therefore, the description will be omitted here.

The mobile phone function unit 310 is a configuration which realizes a phone call function, an e-mail function, and the like and includes a communication antenna 312, a microphone 314, an encoder 316, a transmitting and receiving unit 320, a speaker 324, a decoder 326, and a mobile phone control unit 330.

The microphone 314 collects audio and outputs the audio as an audio signal. The encoder 316 digitally converts and encodes the audio signal input from the microphone 314 based on the control by the mobile phone control unit 330 and outputs the audio data to the transmitting and receiving unit 320.

The transmitting and receiving unit 320 modulates the audio data input by the encoder 316 based on a predetermined scheme and transmits the modulated audio data to a base station of the mobile phone 30 from the communication antenna 312 in a wireless manner. In addition, the transmitting and receiving unit 320 demodulates the wireless signal received by the communication antenna 312, obtains the audio data, and outputs the obtained audio data to the decoder 326.

The decoder 326 decodes the audio data input by the transmitting and receiving unit 320 based on the control by the mobile phone control unit 330, converts the audio data into an analog signal, and outputs the audio signal to the speaker 324. The speaker 324 outputs the audio based on the audio signal supplied from the decoder 326.

The mobile phone control unit 330 supplies received data from the transmitting and receiving unit 320 to the decoder 326 when an e-mail is received, and causes the decoder 326 to decode the received data. Then, the mobile phone control unit 330 outputs the e-mail data obtained by decoding to the display unit 302, causes the display unit 302 to display the e-mail data, and stores the e-mail data on the storage unit 308.

In addition, the mobile phone control unit 330 causes the encoder 316 to encode the e-mail data input via the operating unit 304 when an e-mail is to be transmitted and transmits the encoded e-mail data via the transmitting and receiving unit 320 and the communication antenna 312 in a wireless manner.

An overall control unit 334 controls the aforementioned mobile phone function unit 310 and the navigation function unit 110. For example, the overall control unit 334 may temporarily switch the navigation function to the phone call function by the mobile phone function unit 310 when there is a phone call during the execution of the navigation function by the navigation function unit 110, and cause the navigation function unit 110 to restart the navigation function after the completion of the phone call.

Although the above description was given in detail of a preferable embodiment of the present disclosure with reference to the accompanying drawings, the present disclosure is not limited to such an example. It is obvious for a person who possesses ordinary skill in the art to which the present disclosure belongs that various changes and modifications can be achieved within the scope of the technical idea described in the appended claims, and it should be understood that such changes and modifications also belong to the technical scope of the present disclosure.

For example, although the above description was given to an embodiment in which the tour route generating device is the PND 10 or the mobile phone 30, the present disclosure is not limited to such examples. For example, the tour route generating apparatus may be another mobile electronic device. In addition, although the tour route generating apparatus is realized as one function of the navigation device in the above embodiment, the present disclosure is not limited to such an example. For example, the tour route generating device may be realized in a terminal device without a navigation function, or may be realized in a server device capable of connecting to a network such as the Internet.

Although the above description was given to the embodiment of the tour route generating device with an absolute position measurement function by a GPS and a relative position measurement function by a sensor, the present disclosure is not limited to such an example. For example, the tour route generating device may be provided with a position information obtaining unit including a receiver which receives WiFi electric waves from a plurality of base stations and a current position calculating unit which estimates the distance from each base station based on the receiving intensity of the received WiFi electric wave and calculates a current position based on a principle of triangulation using the distance from each base station and the position of each base station. In addition, although a GPS was exemplified as one example of the position measuring satellite, it is matter of course that the position measuring satellite is not limited to the GPS. The position measuring satellite may be one of various position measuring satellites such as Galileo, GLONASS, Hokuto, Michibiki, and the like. At this time, one kind of position measuring satellite may be used, or position measuring signals by a plurality of kinds of satellites may be used in combination. It is possible to appropriately change the configuration to be used for obtaining the positional information in accordance with the technical level at the time of the execution.

In addition, the steps described in the flowchart include the processing performed in a time-series manner in the described order, of course, while the steps are not necessarily processed in the time-series manner and the steps include the processing executed in a parallel or individual manner. Moreover, it is needless to say that it is possible to appropriately change the order of the steps processed in a time-series manner if necessary.

The present disclosure contains subject matter related to that disclosed in Japanese Priority Patent Application JP 2010-265649 filed in the Japan Patent Office on Nov. 29, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A tour route generating apparatus comprising:
at least on processor configured to:
obtain a target route distance of a tour route to be generated;
obtain a reference point as a start point of the tour route;
determine a waypoint of the tour route; and
generate the tour route such that a route distance from the reference point back to the reference point via the waypoint becomes the target route distance, wherein
to determine a waypoint of the tour route, the at least one processor is further configured to:
determine a plurality of waypoints,
determine a direction from the reference point and first determine a first waypoint positioned in the direction from the reference point and then determine a second waypoint and a third waypoint which are positioned in mutually opposite directions while interposing a line connecting the reference point and the first waypoint, and
when a total route distance, including a sum of (1) a route distance between the reference point and the second waypoint, (2) a route distance between the second waypoint and the first waypoint, (3) a route distance between the first waypoint and the third waypoint, and (4) a route distance between the third waypoint and the reference point, is shorter than the target route distance, correct positions of the second waypoint and the third waypoint to be further away from each other.

2. The tour route generating apparatus according to claim 1,
wherein the at least one processor is configured to generate the tour route by searching for routes between the reference point and the waypoints and between the plurality of waypoints.

3. The tour route generating apparatus according to claim 2, wherein the at least one processor is configured to:
obtain a request with respect to the tour route, and search for a route between the reference point and the waypoints and between the plurality of waypoints based on the request.

4. The tour route generating apparatus according to claim 3,
wherein the at least one processor is configured to determine the waypoints based on the request.

5. The tour route generating apparatus according to claim 1,
wherein the at least one processor is configured to randomly determine the direction every time the tour route is generated.

6. The tour route generating apparatus according to claim 1,
wherein the at least one processor is configured to obtain the target route distance by converting input information regarding calories or traveling time into a distance based on a reference in accordance with a transportation form.

7. The tour route generating apparatus according to claim 1, wherein the at least one processor is configured to:
obtain information regarding a current position, and
obtain the current position as the reference point.

8. The tour route generating apparatus according to claim 1,
wherein the at least one processor is configured to correct the waypoints to points through which a user actually can go, with use of map data near the waypoints after determination of the waypoints.

9. The tour route generating apparatus according to claim 1,
wherein the at least one processor is configured to determine the waypoint such that a linear tour distance obtained by connecting the reference point and the waypoint with a straight line becomes shorter than the target route distance.

10. The tour route generating apparatus according to claim 1, wherein the at least one processor is configured to:
cause a display to display a map display screen in which the tour route is superimposed on a map.

11. The tour route generating apparatus according to claim 10,
wherein the at least one processor is configured to cause the display to display Point Of Interest information around the tour route on the map display screen.

12. The tour route generating apparatus according to claim 1, wherein the at least one processor is configured to:
guide a way along the tour route.

13. The tour route generating apparatus according to claim 1, wherein the at least one processor is configured to generate the tour route without designation of a destination by a user.

14. The tour route generating apparatus according to claim 1, wherein
when the total route distance is larger than the target route distance, the at least one processor is configured to correct the positions of the second waypoint and the third waypoint to be closer to each other, and
the at least one processor is configured to repeat correction of the positions of the second waypoint and the third waypoint until the total route distance is substantially equal to the target route distance.

15. A tour route generating method implemented using a tour route generating apparatus comprising at least one processor for obtaining a target route distance of a tour route to be generated, obtaining a reference point as a start point of the tour, determining a waypoint of the tour route, and generating the tour route such that a route distance from the reference point to the reference point via the viewpoint becomes the target route distance, comprising:
obtaining a target route distance of a tour route to be generated;
obtaining a reference point as a start point of the tour route;
determining a waypoint of the tour route; and
generating the tour route such that a route distance from the reference point to the reference point via the waypoint becomes the target route distance,
wherein determining a waypoint includes:
determining a plurality of waypoints,
determining a direction from the reference point, first determining a first waypoint positioned in the direction from the reference point, and then determining a second waypoint and a third waypoint which are positioned in mutually opposite directions while interposing a line connecting the reference point and the first waypoint, and
when a total route distance, including a sum of (1) a route distance between the reference point and the second waypoint, (2) a route distance between the second waypoint and the first waypoint, (3) a route distance between the first waypoint and the third waypoint, and (4) a route distance between the third waypoint and the reference point, is shorter than the target route distance, correcting positions of the second waypoint and the third waypoint to be further away from each other.

16. A non-transitory computer readable medium having stored thereon a program which causes a computer to implement a method, the method comprising:
obtaining a target route distance of a tour route to be generated;
obtaining a reference point as a start point of the tour route;
determining a waypoint of the tour route; and
generating the tour route such that a route distance from the reference point to the reference point via the waypoint becomes the target route distance,
wherein determining a waypoint includes:
determining a plurality of waypoints,
determining a direction from the reference point, first determining a first waypoint positioned in the direction from the reference point, and then determining a second waypoint and a third waypoint which are positioned in mutually opposite directions while interposing a line connecting the reference point and the first waypoint, and
when a total route distance, including a sum of (1) a route distance between the reference point and the second waypoint, (2) a route distance between the second waypoint and the first waypoint, (3) a route distance between the first waypoint and the third waypoint, and (4) a route distance between the third waypoint and the reference point, is shorter than the target route distance, correcting positions of the second waypoint and the third waypoint to be further away from each other.

17. A tour route generating apparatus comprising:
at least one processor configured to:
obtain a target route distance of a tour route to be generated;
obtain a reference point as a start point of the tour route;
determine a waypoint of the tour route; and
generate the tour route such that a route distance from the reference point back to the reference point via the waypoint becomes the target route distance, wherein to determine a waypoint of the tour route, the at least one processor is further configured to:
   determine a plurality of waypoints,
   determine a direction from the reference point and first determine a first waypoint positioned in the direction from the reference point and then determine a second waypoint and a third waypoint which are positioned in mutually opposite directions while interposing a line connecting the reference point and the first waypoint, and
   when a total route distance, including a sum of (1) a route distance between the reference point and the second waypoint, (2) a route distance between the second waypoint and the first waypoint, (3) a route distance between the first waypoint and the third waypoint, and (4) a route distance between the third waypoint and the reference point, is larger than the target route distance, correct positions of the second waypoint and the third waypoint to be closer to each other.

18. A tour route generating apparatus comprising:
   at least one processor configured to:
      obtain a target route distance of a tour route to be generated;
      obtain a reference point as a start point of the tour route;
      determine a waypoint of the tour route; and
      generate the tour route such that a route distance from the reference point back to the reference point via the waypoint becomes the target route distance, wherein
   to determine a waypoint of the tour route, the at least one processor is further configured to:
      determine a plurality of waypoints, and
      determine a direction from the reference point and first determine a first waypoint positioned in the direction from the reference point and then determine a second waypoint and a third waypoint which are positioned in mutually opposite directions while interposing a line connecting the reference point and the first waypoint, and
   to determine each of the plurality of waypoints, the at least one processor is configured to:
      determine an angle with respect to a line extending from the reference point,
      determine a point which is located a linear distance away from the reference point and on the angle, and
      search through points around the point to determine the waypoint.

* * * * *